US006543050B1

(12) United States Patent
Letellier et al.

(10) Patent No.: US 6,543,050 B1
(45) Date of Patent: Apr. 1, 2003

(54) METHOD AND APPARATUS FOR ENLARGING DVB-CI FUNCTIONALITY BY ENABLING A DIRECT ACCESS TO THE CONDITIONAL ACCESS MODULE

(75) Inventors: Philippe Letellier, St Grégoire (FR); Eric Diehl, Liffré (FR); Stéphane Morcel, Rennes (FR)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/329,570

(22) Filed: Jun. 10, 1999

(30) Foreign Application Priority Data

Jun. 11, 1998 (EP) .............................................. 98401425

(51) Int. Cl.[7] .......................... H04N 7/167; H04N 7/16; G06F 11/30
(52) U.S. Cl. .............................. 725/31; 725/25; 725/28; 725/30; 380/239; 713/200; 713/201; 713/202
(58) Field of Search ............................. 725/25, 28, 30, 725/31; 713/200, 201, 202; 380/239

(56) References Cited

U.S. PATENT DOCUMENTS 5,237,610 A * 8/1993 Gammie ....................... 380/10
5,796,829 A * 8/1998 Newby ......................... 380/21

OTHER PUBLICATIONS

"A Common Conditional Access Interface for Digital Video Broadcasting Decoders", Jean–Luc Giachetti, Vicent Lenoir, Andre Codet, David Cutts, John Sager, IEEE Transaction on Consumer Electronics, vol. 41, No. 3, Aug. 1995.*
"DVB–CI: Gateway to Truly Interactive Multimedia Environment", I Okoth, R Schneider, J–Y Leroux, International Broadcasting Convention, Sep. 12–16, 1997, Conference Publication No. 447, IEE 1997.*
Cutts D.J.: "DVB Conditional Access", Electronics and Communication Engineering Journal, vol. 9, No. 1. Feb. 1997, pp. 21–27, XP000722905.
Giachetti J.L. et al. "A common Conditional Access Interface for Digital Video Broadcasting Decoders", IEEE Transactions on Consumer Electronics, vol. 41, No. 3, Aug. 1995, pp. 836–841, Xp000539543.
European Broadcasting Union: "Digital broadcasting systems for television, sound and data services; specification for service information (SI) in digital broadcasting (DVB) systems", European Telecommunications Standards Institute, EU, Oct. 1995, XP002079535.
European Search Report citing the above–listed references AR, AS, and AT.

* cited by examiner

*Primary Examiner*—Andrew Faile
*Assistant Examiner*—Robert Pham
(74) *Attorney, Agent, or Firm*—J. S. Tripoli; R. D. Shedd; D. T. Shoneman

(57) ABSTRACT

The invention is to be used in the Digital Video Broadcasting—Common Interface environment for accessing the Conditional Access Module (CAM). The host application handles objects of the Conditional Access (CA) through a private Application Program Interface (API). Each CAM may have its own private CA API but the data channel remains identical whatever the CAM is. This new mode coexists with the two already defined modes: low level Man Machine Interface, and high level Man Machine Interface. If a Set top Unit "understands" the private CA Application Program Interface (API), then it may access the features of the plugged CA through its private CA API Protocol. Otherwise, it remains on the standard API. With this extension, an STU can have a Conditional Access User Interface which perfectly fits into the overall User Interface of the STU. Thus b broadcaster can ensure that its look and feel are respected on its STUs. A manufacturer can build an STU especially optimized for a given or a plurality of Cas but still able to run other CAs.

10 Claims, 4 Drawing Sheets

METHOD AND APPARATUS FOR ENLARGING DVB-CI FUNCTIONALITY BY ENABLING A DIRECT ACCESS TO THE CONDITIONAL ACCESS MODULE

FIELD OF THE INVENTION

The present invention relates to Digital Video Broadcasting systems and more particularly to a method and an apparatus for extending the Digital Video Broadcasting—Common Interface function by enabling a direct access to conditional access features.

BACKGROUND ART

The environment from which the present invention is derived is the digital video broadcasting (DVB) a detailed specification of which is given in the Standards. One may refer, for instance, to the European Telecommunication Standards Institute (ETSI) relating to the Digital Video Broadcasting published in EN 300 468—v1.3.1 (1997-09). Any other digital video broadcasting specification may be used.

The DVB—Common Interface (DVB-CI) for Conditional Access and Other Digital Video Broadcasting Applications is one of a few consumer hardware interfaces specified by the DVB. It is designed to bring the full benefits of open standardization to the supply of digital reception equipment, whilst at the same time making it possible for the Conditional Access and security elements of a digital TV receiver system to remain proprietary. By using this interface, the proprietary elements of the system can be separated from the parts required to receive and decode digital television and data services. They can be manufactured and distributed separately, releasing the constraints which occur when the elements are supplied together.

One may refer to the European Standard issued in April 1996 by the CENELEC (Comite Europeen de Normalisation Electrotechnique), on "Common Interface Specification for Conditional Access and other Digital Video Broadcasting Set Top Box Applications ". This document aims to describe a common interface by defining the standards that relate to the source coding, channel coding, service information, STU interfaces and a conditional access. This latter is used when there is a need to control access to a broadcast service which is a set of elementary streams offered by the user as a program. According to the document, the application operates in a module, communicating with the host, and provides facilities to the user over and above those provided directly by the host. The host is a multimedia device such as a PC, a VCR or an IRD etc. where modules can be connected. Conversely, a module is a small device, which is not working by itself, but is designed to run specialized tasks in association with a host such as a conditional access sub system, an electronic program guide application module, or to provide resources required by an application but not provided directly by the host. The resource is a unit of functionality provided by the host for use for a module. It defines a set of objects exchanged between module and host by which the module uses the resource.

In this CENELEC document, a solution to the problem for broadcasters to access decoders with different conditional access systems and to ensure that they have choice of supply of such systems consists in using a standardized interface between a module and a host where Conditional Access and more generally defined proprietary functions may be implemented in the module. Consequently, broadcasters can use modules containing solutions from different suppliers in the same broadcast system, thus increasing their choice and anti-piracy options.

Consistency is one of the most important problems to solve for the design of good user interface. To allow a user to understand and to learn a User Interface (UI), it is mandatory that the same concepts be identically labeled all over the UI. This concept consists in using a predetermined format whereas the content of the messages is not compulsory. Furthermore, concerning the organization of the information, it must be conformed with the consistency rule.

With the current approach of the DVB-CI, this purpose is hardly reachable. Different Conditional Access Modules (CAM) refer to similar concepts such as entitlements, tokens, or pay per view, with different names. The way to access the different features is different from one CAM to another. For instance, each CAM provider proposes its own hierarchical menu organization with its own labels. All these differences co-existing in the same STU will necessarily confuse the user. The use of a unique look and feel is not sufficient to avoid the confusion.

It is not realistic to target a Set Top Unit compliant with all the private Conditional Access Application Program Interfaces. In many cases, for a given place, there are only one or two leading Conditional Access systems. Thus, an optimized STU would perfectly answer to the largest market whilst remaining open to minor CA systems even though for these latest ones, it would not offer the optimal User Interface.

SUMMARY OF THE INVENTION

It is a main object of the invention to provide a method and an apparatus for providing Conditional Access features to STU as if the CA modules were transparent.

It is thus an object of the invention to offer in the DVB-CI environment an additional method and apparatus for accessing directly the Conditional Access Module in addition to the standardized access by defining a protocol of communications with a predetermined format.

It is a further object of the invention to allow the communication between the Set Top Box and the Conditional Access Module without imposing a predefined content of the communication messages.

The invention is to be used in the Digital Video Broadcasting—Common Interface environment for accessing the Conditional Access Module (CAM). The host application handles objects of the Conditional Access (CA) through a private Application Program Interface (API). Each CAM may have its own private CA API but the data channel remains identical whatever the CAM is.

According to the present invention, a private CA Application Program Interface concept and a standard Application Program Interface concept can coexist together. The Private API is a new mode which coexists with the two already defined modes of high and low Man Machine Interface resource.

If a STU "understands" the private CA Application Program Interface (API), then it may access the features of the plugged CA through its private CA API Protocol. Otherwise, it remains on the standard API.

With this extension, a STU can have a Conditional Access User Interface which perfectly fits into the overall User Interface of the STU. Thus, a broadcaster can ensure that its look and feel are respected on its STUs. A manufacturer can build a STU especially optimized for a given CA or a plurality of CAs but still able to run other CAs.

According to the present invention, a method for allowing communications exchange between at least one Conditional Access Module and a user interface of a multimedia device in a communications system by enabling a direct access to said at least one conditional access module, said communication system using a standard application program interface protocol and a private application program interface protocol, comprises the steps of:

transmitting a first message (PCA_identification) from said conditional access module to said user interface containing predetermined parameters, wherein said parameters are dedicated to said private application program interface protocol;

checking if said user interface are conformed to said parameters;

responding with a second message (PCA_identification answer) from said user interface to said conditional access module, said second message containing a result of the matching between the Conditional Access Module and the user interface parameters; and in response to said second message, selecting said private protocol or said standard protocol.

Furthermore, an apparatus for implementing the method for allowing communications between a plurality of conditional access module and a user interface according to the present invention is disclosed therein.

DETAILED DESCRIPTION OF THE INVENTION

Figure 1:
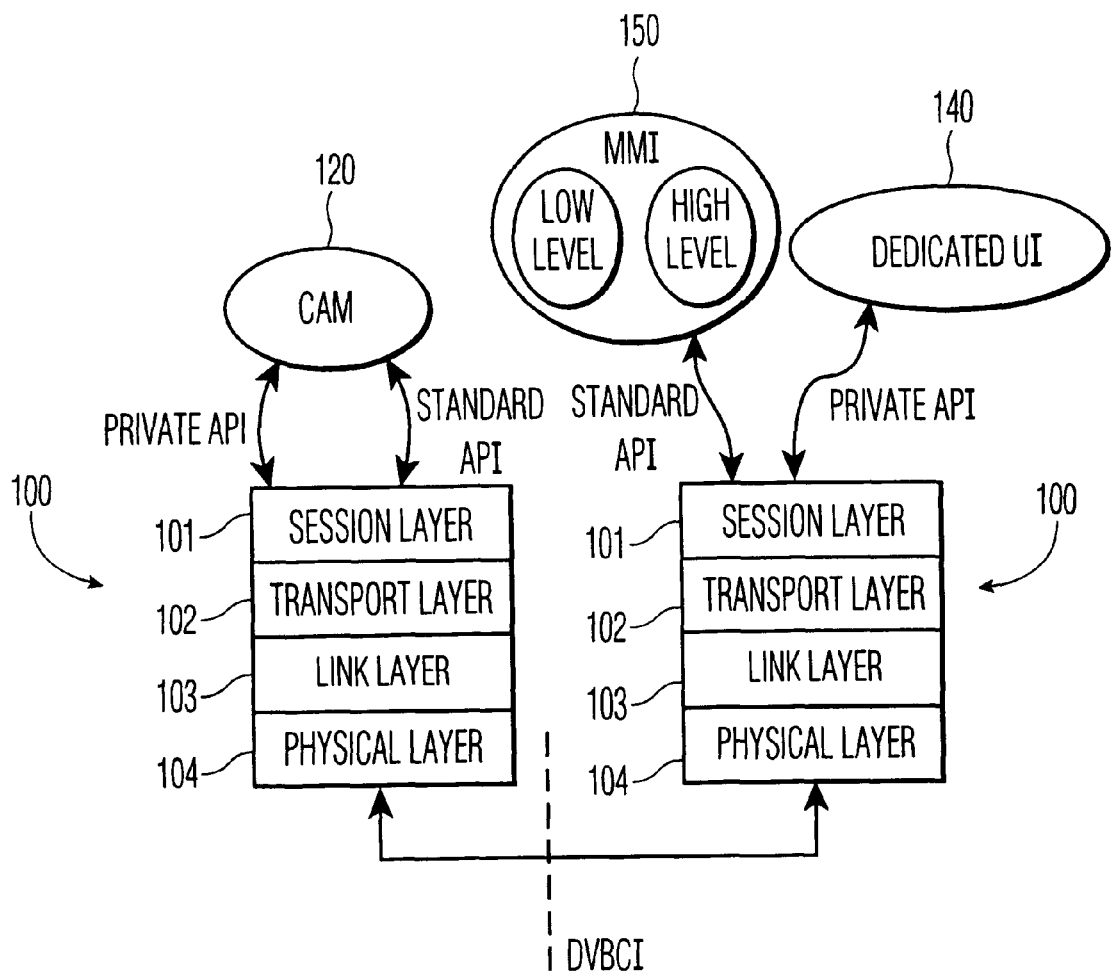
FIG. 1 shows the environment of the present invention wherein a single module is in connection with a host.

FIG. 1 illustrates the overview of the present invention wherein a private CA Application Program Interface concept and a standard Application Program Interface concept coexist together.

On one side, the Set Top Unit application handles objects of the CA Module, referred as CAM (120), through a private API, but the data channel remains identical whatever the CAM is. Each CAM may have its own private API in addition to a standard API. The CAM communicates with the DVB-CI through a driver (100) that contains four communication layers. These layers are the Session layer (101), the Transport layer (102), the Link layer (103) and the Physical layer (104).

On the other side, the DVB-CI also has a driver (100) that includes the same four communication layers. These four layers communicate with a Man Machine Interface referred as MMI (150) through a standard API and with a dedicated User Interface (140) through a private API.

The Private API is a new mode which coexists with the two already defined modes that are the high and low MMI resource.

If a STU "understands" the private CA Application Program Interface (API), then it may access the features of the plugged CA through its private API protocol. Otherwise, it remains on the standard API protocol.

The common interface consists of two components, a Transport Stream Interface and a Command interface. Both are layered to make the overall interface design and implementation easier.

The Transport Stream Interface carries MPEG-2 transport packets in both directions owing to a bi-directional bus. If the module give access to any services in the Transport Stream and those services have been selected by the host, the packets carrying those services will be returned descrambled, and the other packets are not modified.

The Command Interface carries all communication between the applications running in the module and the host. The communication protocols on this interface are defined in several layers to provide the necessary functionality. This functionality comprises: the ability to support multiple modules on one host, the ability to support complex combinations between module and host, and an extensible set of functionality primitives (also called objects) which allow the host to provide resources to the module.

An associated application layer which is common to all physical implementations is designed to be free of specific application semantics. It does not limit the number of modules which may be connected to the host at any time. When several modules are connected to a host, this latter should be able to select the module(s) relevant for the descrambling of the selected service(s).

Figure 2:
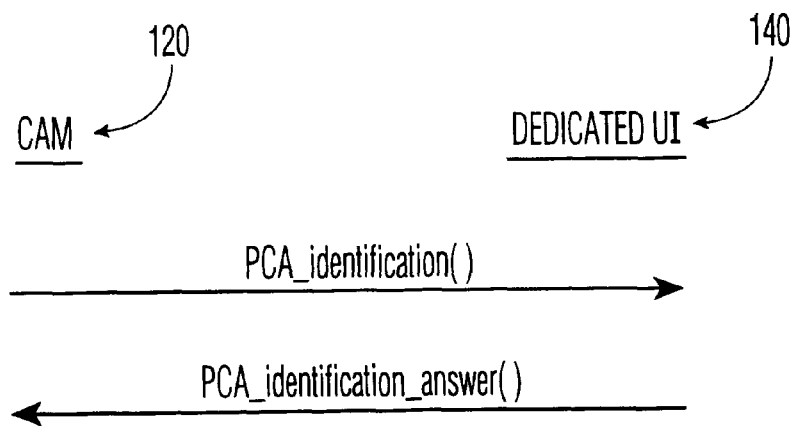
FIG. 2 illustrates the communication protocol between the Conditional Access Module and the Dedicated User Interface.

FIG. 2 illustrates a protocol of communication between a Conditional Access Module (120) and a Dedicated User Interface (140). After initialization, in order to ask the dedicated UI to check if it understands the CAM's private API, the CAM sends a PCA_identification( ) object to the dedicated UI resource. According to the present protocol, this latter responds with an identification answer to the CAM. This protocol is common to all CAMs which have a private API. In this response, the Set Top Unit sends a PCA_identification answer ( ) object which contains the result of the match between the CAM and the dedicated UI parameters that will be detailed later on.

If the parameters match, the private API will be used, else it will be the standard API.

As is mentioned above, the communication for data across the command interface is defined in terms of objects. The objects are coded by means of a general Tag-Length-Value coding.

In addition to the objects already defined in the standards and in CENELEC document, it is required to define two types of exchanged objects that are the identification objects and the data objects. The content of these two objects is common to all private CA API Protocols.

Identification Objects

The function of these identification objects is to allow a CAM having private API to check if it can communicate with a dedicated User Interface resource of the Set Top Unit, for instance to check if it understands the host through a private API.

An identification object is sent first by the CAM. This object contains all the information needed to check the matching between the STU and the DVB-CAM. A Set Top Unit with a private CA API protocol will answer by sending back an identification_answer object. On the contrary, a Set Top Unit without a private CA API protocol will not answer satisfactorily to this identification.

In the preferred implementation, the identification object may contain 3 parameters. But it should be kept in mind that it is possible to implement solely one of these parameters or to implement additional parameters.

The parameters are:—Conditional Access identifier
Manufacturer Name
Version of the Conditional Access program
The additional parameters are dedicated to private data. These objects have the following formats:

```
PCA_Identification_Object ()
{
    PCA_Identification_Tag          24 bits
                                    uimsbf
    Lenght_field ()
    CA_Identifier                   24 bits
                                    uimsbf
    Manufacturer_length ()
    CA_Identifier                   24 bits
                                    uimsbf
    Manufacturer_length             8 bits
                                    uimsbf
    for (i=0; i < manufacturer_length; i++)
    {
        manufacturer_char           8 bits
                                    uimsbf
    }
    version ID                      24 bits
                                    uimsbf
    private_field_length ()         8 bits
                                    uimsbf
    for (i=0; i<private_field_length; i++)
    {
        private_field_data
    }
}
``` wherein:
  uimsbf stands for unsigned integer most significant bit first;
  Manufacturer_char is a compound of string of the manufacturer's name. The string is not null terminated;
  Version_ID comprises 3 bytes. The first byte is the main release number. The second and respectively the third bytes are the sub and the subsub release number.

```
PCA_Identification_answer_Object ()
{
    PCA_Identification_answer Tag   24 bits
                                    uimsbf
    Length_field () = 1
    Identification_result           8 bits
                                    uimsbf
}
```

Data Objects

The data objects have predetermined headers but not a predetermined content. For the preferred embodiment, there are three kinds of data objects:
  Inquiry Tag: used by the Host or the Conditional Access Module to request information in a bi-directional mode;
  Answer Tag: used by the Host or the Conditional Access Module to answer in response to an Inquiry Tag in a bi-directional mode;
  Notification Tag: used for notifying information to the Host or the Conditional Access Module.

```
PCA_Inquiry_Object ()
{
    PCA_Inquiry_Tag                 24 bits     uimsbf
    length_field ()
    for (i=0; i<length; i++)
    {
        PCA data_unit               8 bits
                                    uimsbf
    }
}
PCA_Answer_Object ()
{
    PCA_Answer_Tag                  24 bits
                                    uimsbf
    length_field ()
    for (i=0; i<length; i++)
    {
        PCA_data_unit               8 bits
                                    uimsbf
    }
}
PCA_Notify_Object ()
{
    PCA_Notify_Tag                  24 bits     uimsbf
    length_field ()
    for (i=0; i<length; i++)
    {
        PCA_data_unit               8 bits
                                    uimsbf
    }
}
```

The content of the PCA_data_unit depends entirely on the plugged DVB-CAM. This level of the API is not public. It is a definition proprietary to the STU's manufacturer and the DVB CAM's manufacturer. There is no need to standardize this content. It is up to the host application to perform the right manipulations to build a consistent User Interface for multiple Conditional Access systems.

Figure 3:
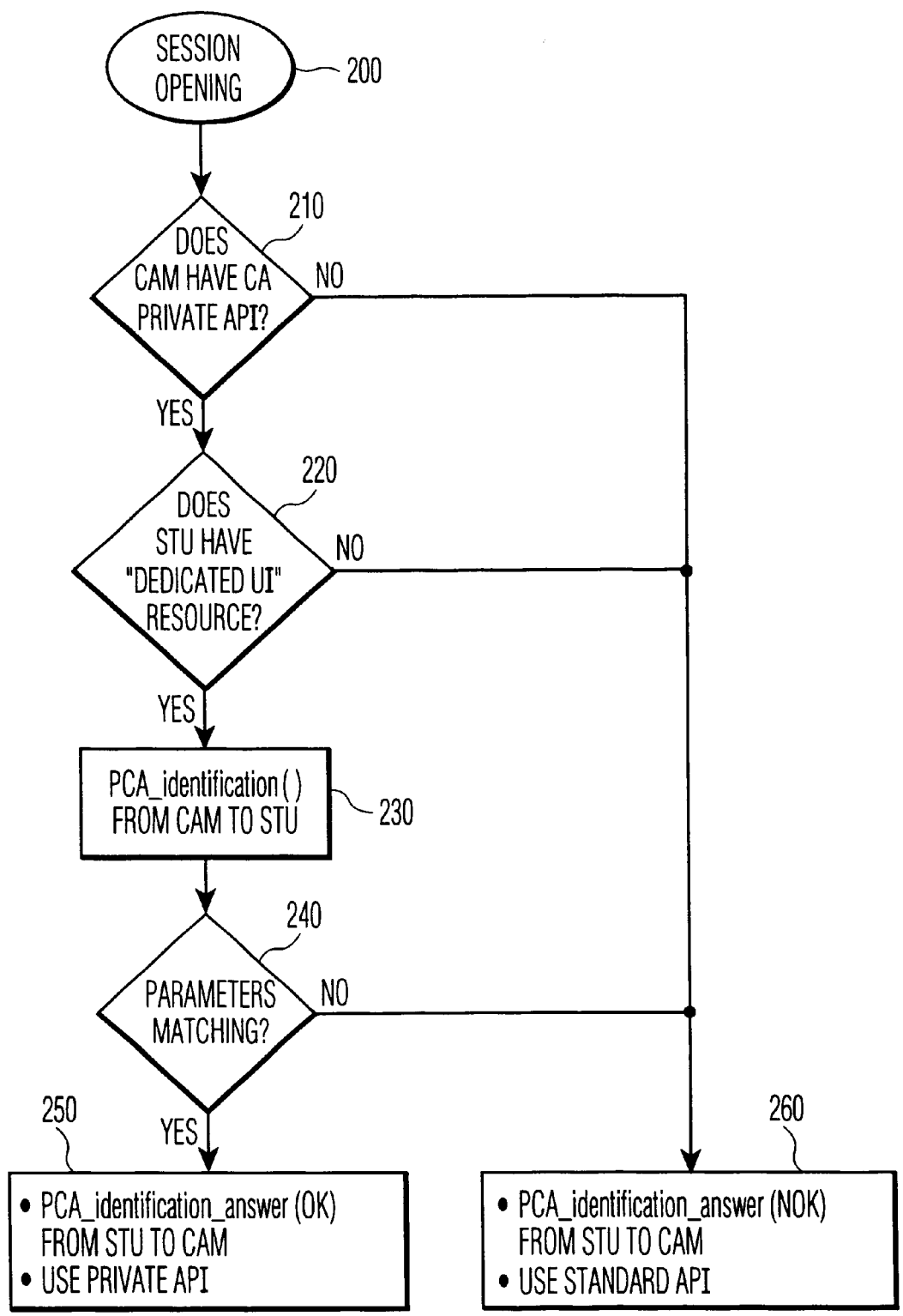
FIG. 3 shows the flow chart of the process for determining the use of a private API or a standard API according to the present invention.

FIG. 3 represents a flow chart, according to the present invention, that illustrates when to use a private API or a standard API and how the above defined identification objects are used in this identification process.

After the session opening, at step (200), the Host transmits an identification request to the CA Module, at step (210).

At step (220), it is determined whether the CA Module is supported. If it is not supported, then the standard API Protocol is used, at step (260), for connecting to a generic user interface located in the Host. Otherwise, the CA Module sends an identification answer to the Host, at step (230).

At step (240), owing to the identification answer, it is determined if the parameters defined in the identification objects are known by the Host, for instance if the CA_identifier, the Manufacturer_char and the Version_Id are identified by the Host. As is already mentioned, other parameters may be added to this list.

If the parameters are known, then a private CA API protocol can be used for connecting to the dedicated user interface or resource, at step (250). Otherwise, the standard CA API protocol is used at step (260).

More in details, at step (260), the connection between a CA Module to a generic user interface is performed according to a standard API protocol defined in the DVB-CI guidelines issued by the DVB Project Office of the European Broadcasting Union, Geneva, Switzerland. According to these guidelines, applications running on modules make use of services provided by the Host. These services are partitioned into resources which encapsulate the total functionality available into a plurality of easily managed pieces. The resources are defined as simple, low-level functions in opposition to high level. The high level is used when the application can determine the content of the interaction but surrenders the method of the interaction to the Host. On the contrary, the low level uses the Man Machine Interface (MMI) wherein the Host is not involved with the ergonomics of the application's display such as:

the color depth the amount of memory provided for graphics the drawing speed the number of concurrent MMI sessions supported the interface ergonomics for moving between applications etc.

Conversely, at step (250), if a private CA API protocol is chosen to connect to a dedicated user interface, then the data objects as defined in the inquiry, answer and notification objects are used for the communication exchanges between the corresponding CA Module and the Host. According to the private CA API protocol, the ergonomics of the application's display can be fully controlled, thanks to the direct access to all the features of CA Module making this latter transparent.

Figure 4A:
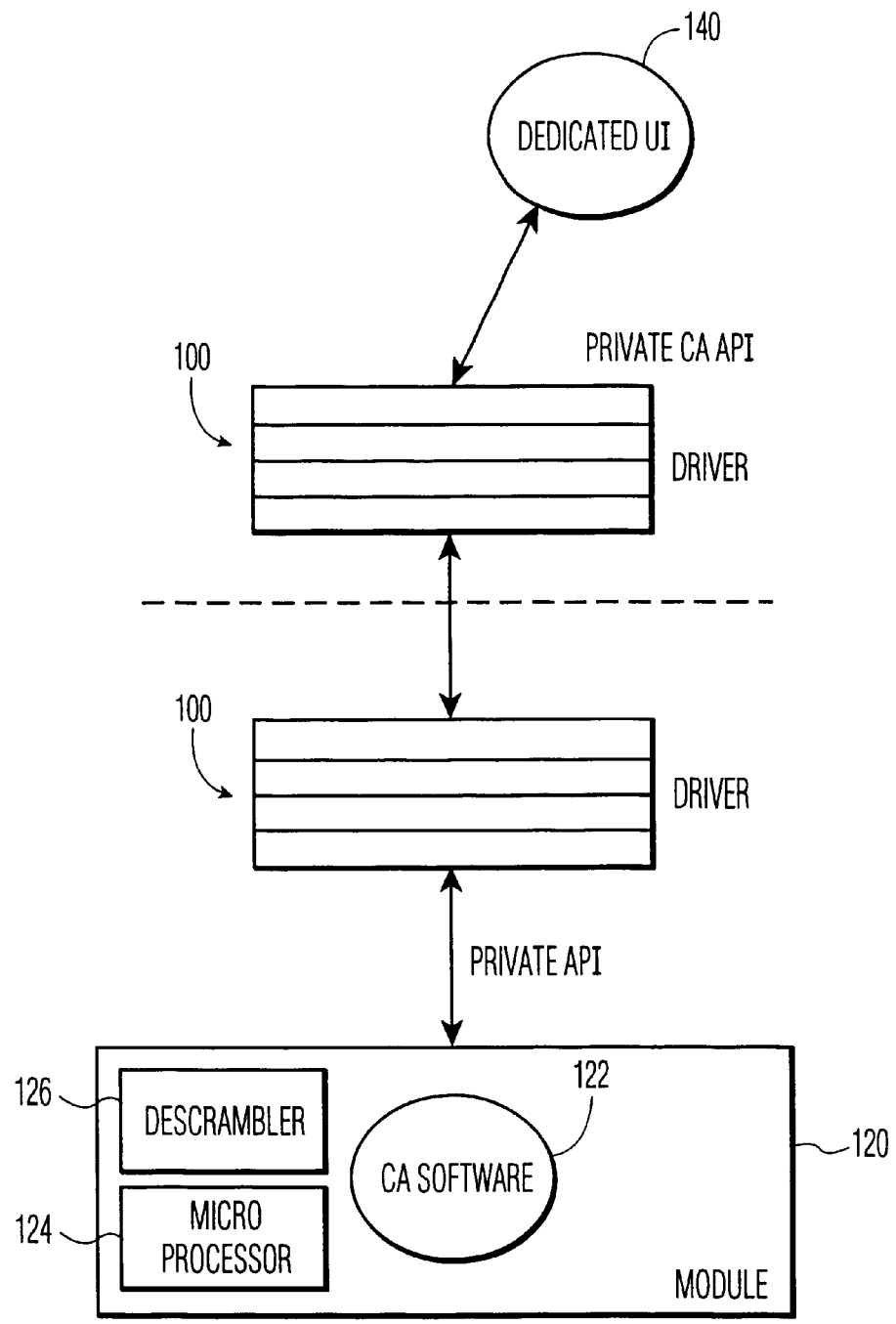
FIG. 4A shows the case when the private CA Application Program Interface protocol is used.

FIG. 4A illustrates the use of the private CA API. It is mandatory that the dedicated User Interface (140) matches the plugged DVB-Conditional Access Module (120). For this purpose, an identification process allows this checking.

The plugged DVB-CAM contains a descrambler (126), a microprocessor (124) that controls the communication exchange and a Conditional Access Software (122). This CA software allows the communication with the DVB-CI.

Figure 4B:
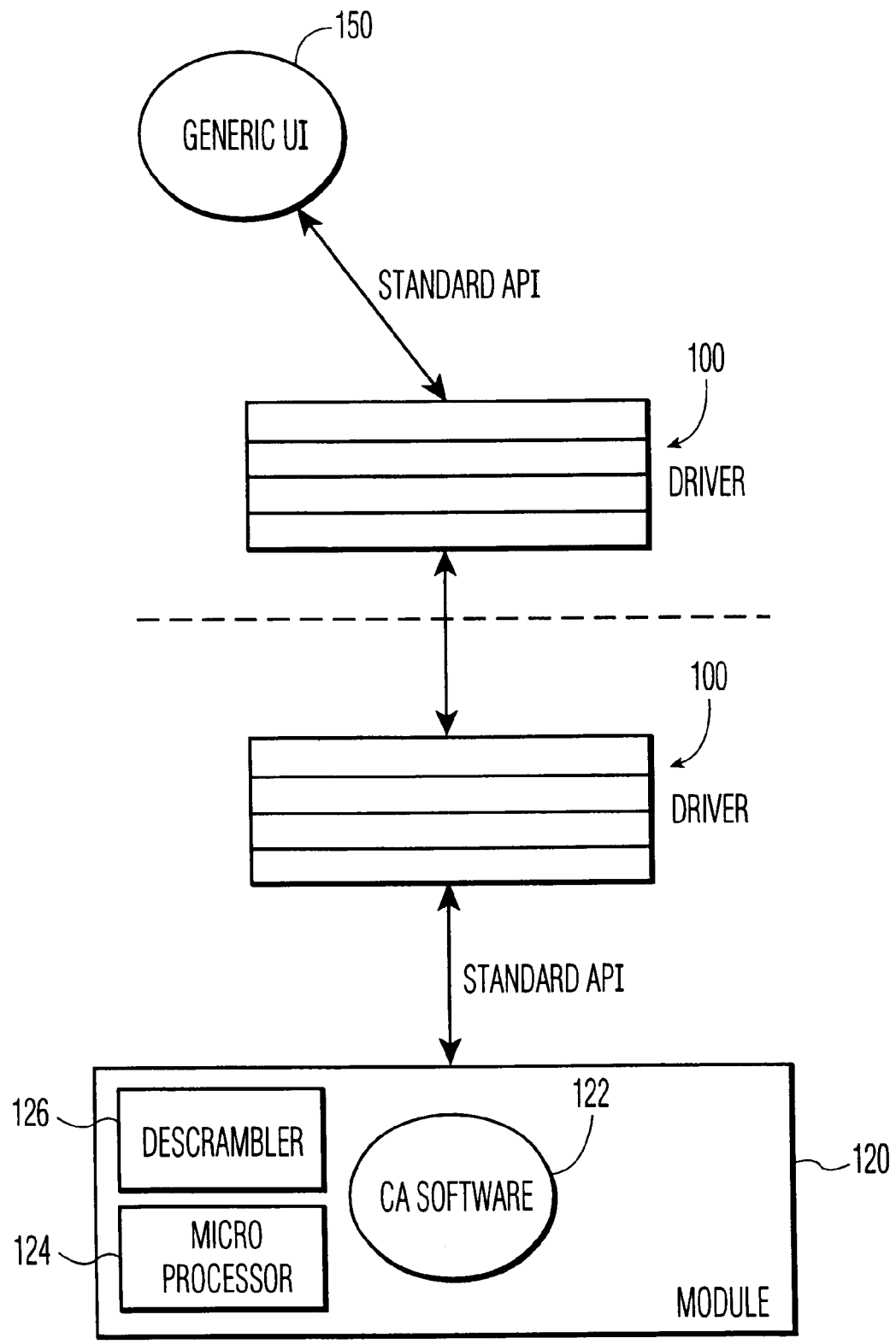
FIG. 4B shows the case when the standard CA Application Program Interface protocol is used.

If the STU does not understand the private CA API, then it uses the standard API protocol as illustrated in FIG. 4B with either the low level MMI or the high level MMI.

FIG. 4B represents the case when the Set Top Unit mismatches with the DVB-Conditional Access Module. In such case, the Standard API Protocol is used instead. Thus, this standard protocol enables to communicate with the generic User Interface.

It should be kept in mind that the present implementation can also be adapted to an environment of a plurality of CA Modules that are connected to the Host. The parameters of CA Module that are known at step (240) are then selected for the communication exchanges, at step (250).

It should also be noted that, although all the preceding description has been made with reference to the DVB-CI standard, the invention is also applicable to the National Renewable Security Standard (NRSS) environment.

What is claimed is:

1. A method for allowing communications exchange between at least one Conditional Access Module and a user interface of a multimedia device in a communications system by enabling a direct access to said at least one conditional access module, said communication system using a standard application program interface protocol and a private application program interface protocol;

wherein said method comprises the steps of:

transmitting a first message from said conditional access module to said user interface containing predetermined parameters, wherein said parameters are dedicated to said private application program interface protocol;

checking if said user interface is matching said parameters;

responding with a second message from said user interface to said conditional access module, said second message containing a result of the matching between the Conditional Access Module and the user interface parameters; and in response to said second message, selecting said private protocol or said standard protocol.

2. The method of claim 1 wherein said first message defines a predetermined format for the communications exchange between said Conditional Access Module and said user interface.

3. The method of claim 1 wherein the parameters of said first message contain at least the indication of the Conditional Access Module identification, the manufacturer name or the version of the conditional access program.

4. The method of claim 1 wherein before transmitting said first message, said method further comprises the steps of:

determining if said conditional access module contains a private application program interface protocol; and determining if said multimedia devices has a dedicated user interface using said private application program interface protocol.

5. The method of claim 1 wherein in case of private protocol selection the following communication exchange between said user interface and said conditional access module uses predefined data formats regardless of their contents.

6. The method of claim 5 wherein said predefined data formats are used either by said conditional access module or said user interface for requesting information, for answering in a bi-directional mode, or for notifying information to said conditional access module or said user interface.

7. An apparatus for allowing communications exchange between at least one Conditional Access Module and a user interface of a multimedia device in a communications system by enabling a direct access to said at least one conditional access module, said communication system using a standard application program interface protocol and a private application program interface protocol;

wherein said apparatus comprises:

means for transmitting a first message from said conditional access module to said user interface containing predetermined parameters, wherein said parameters are dedicated to said private application program interface protocol;

means for checking if said user interface is matching said parameters;

means for responding with a second message from said user interface to said conditional access module, said second message containing the result of the matching between the Conditional Access Module and the user interface parameters; and means for selecting said private protocol or said standard protocol according to said second message.

8. The apparatus of claim 7 wherein said first message defines a predetermined format for the communications exchange between said Conditional Access Module and said user interface.

9. The apparatus of claim 7 wherein in case of private protocol selection the following communications exchange between said user interface and said conditional access module uses predefined data formats regardless of their contents.

10. The apparatus of claim 7 wherein said multimedia device is a set top unit connected to a display device.

* * * * *

UNITED STATES PATENT AND TRADEMARK OFFICE
CERTIFICATE OF CORRECTION

PATENT NO. : 6,543,050 B1 Page 1 of 1
APPLICATION NO. : 09/329570
DATED : April 1, 2003
INVENTOR(S) : Philippe Letellier, Eric Diehl and Stéphane Morcel It is certified that error appears in the above-identified patent and that said Letters Patent is hereby corrected as shown below:

Title page, item [57] in the ABSTRACT:
Line 16, the letter "b" should read --a--;
Line 17, the word "an" should read --a--;
Line 18, between "given" and "or" should be --CA--; and
Line 18, after "of", "Cas" should be --CAs--.

Signed and Sealed this

Thirtieth Day of December, 2008

JON W. DUDAS
*Director of the United States Patent and Trademark Office*